United States Patent

[11] 3,547,483

| [72] | Inventor | Donald J. Ehrlich |
| | | Monon, Ind. |
| [21] | Appl. No. | 782,322 |
| [22] | Filed | Dec. 9, 1968 |
| [45] | Patented | Dec. 15, 1970 |
| [73] | Assignee | Monon Trailer, Inc. |
| | | Monon, Ind. |
| | | a corporation of Indiana |

[54] TRAILER BODY CONSTRUCTION
8 Claims, 3 Drawing Figs.

[52] U.S. Cl. .................................................. 296/28,
105/409
[51] Int. Cl. ............................................. B62d 27/02
[50] Field of Search ......................................... 296/28,
28.2; 52/281, 624, 483; 105/409

[56] References Cited
UNITED STATES PATENTS
2,815,722 12/1957 Dean .......................... 105/409
3,156,503 11/1964 Chieger ...................... 296/28(.2)

Primary Examiner—Banjamin Hersh
Assistant Examiner—Robert R. Song
Attorney—Olson, Trexler, Wolters & Bushnell ABSTRACT: There is disclosed a truck or trailer body having a heavy steel side frame member along the bottom thereof. Sidewalls of thin sheet material are secured to an intermediate anchor member by a plurality of relatively closely spaced fasteners, which anchor member is in turn secured to the relatively heavy frame member.

PATENTED DEC 15 1970
3,547,483
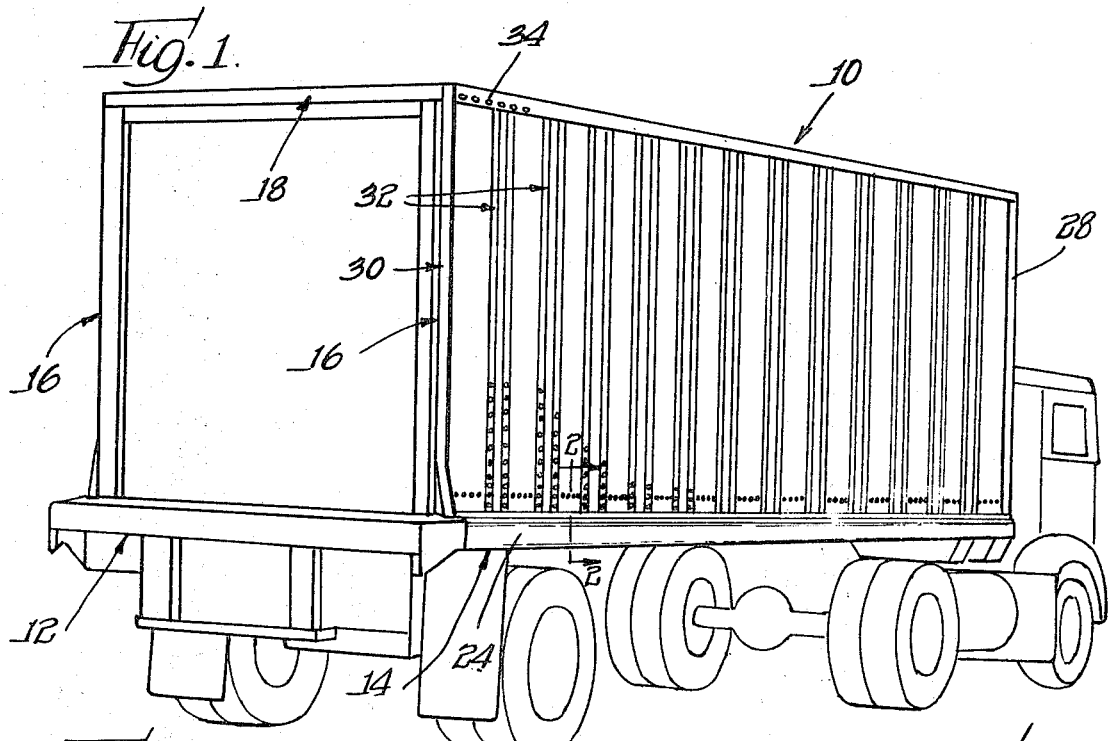
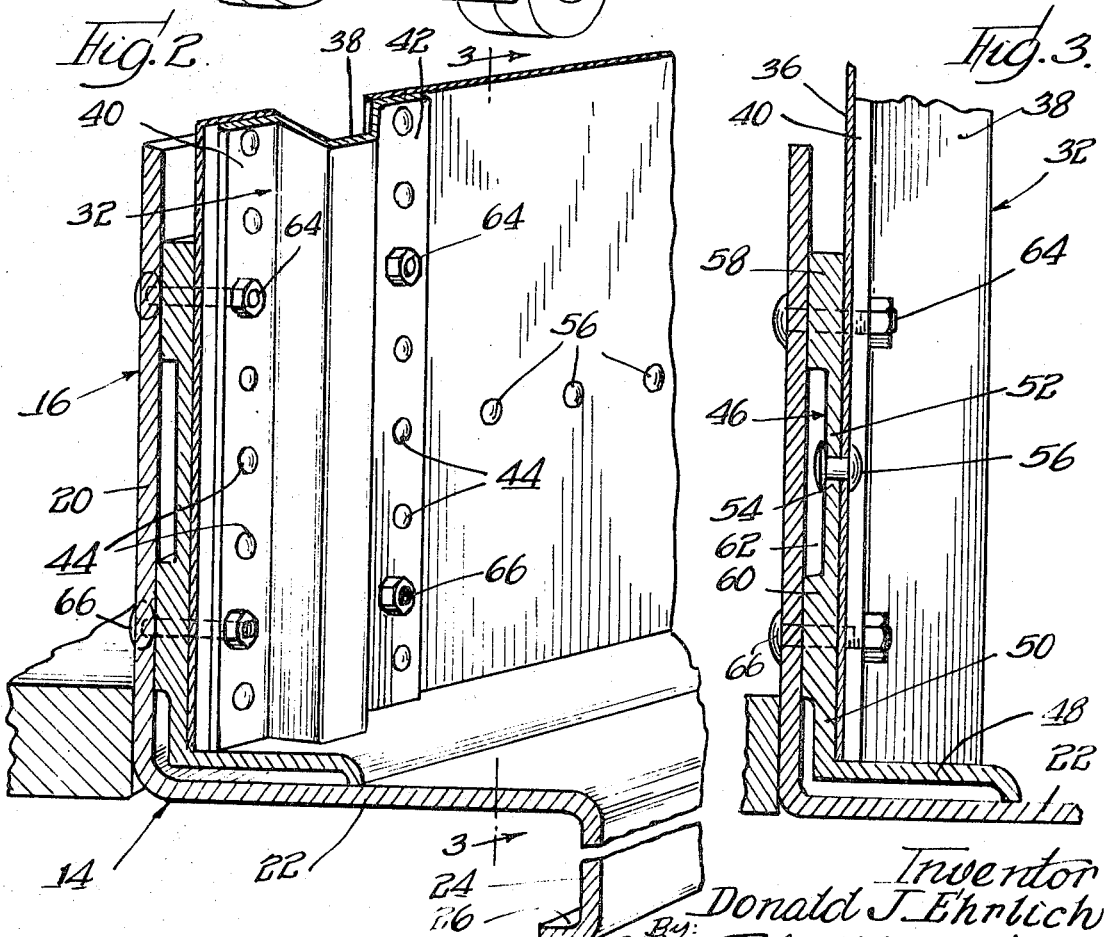
Inventor
Donald J. Ehrlich
By: Olson, Trexler, Wolters & Bushnell attys

TRAILER BODY CONSTRUCTION

The present invention relates to a novel vehicle construction, and more specifically to novel bodies for trailer trucks and the like.

Trailer truck bodies or vans have heretofore been proposed with various constructions including a base frame and sidewalls having sheet material panels fixed to a portion of the base frame with a plurality of closely spaced fasteners or rivets. Such base frames usually include long longitudinally extending side members which may become accidentally damaged as a result of a collision with another vehicle or object. The problem of such damage is particularly acute when the vehicle is used for short haul or delivery work in cities.

It is an important object of the present invention to provide a novel truck or van construction which is relatively rugged and resistant to damage of the above described type and which at the same time may be relatively easily and economically assembled.

A more specific object of the present invention is to provide a novel truck body or van construction including a frame having heavy and rugged base rails resistant to collision damage, sidewalls comprising panels of thin lightweight sheet material and means for fastening margins of the panels to the base rails securely, easily and economically.

In accomplishing the foregoing objects, it is contemplated that one embodiment of the present invention may include a relatively heavy and rugged base rail formed from steel, sidewall panels formed from thin, lightweight aluminum, and an intermediate weight anchor member to which the panels are secured by closely spaced fasteners such as rivets and which in turn is secured to the base rail by relatively widely spaced fasteners.

Other objects and advantages of the present invention will become apparent from the following description and the accompanying drawings wherein:

FIG. 1 is a perspective view showing a trailer truck body structure incorporating features of the present invention;

FIG. 2 is an enlarged fragmentary perspective view taken generally along line 2-2 in FIG. 1; and FIG. 3 is a fragmentary sectional view taken along line 3-3 in FIG. 2.

Referring now more specifically to the drawings wherein like parts are designated by the same numerals throughout the various FIGS., a truck body 10 incorporating features of the present invention is shown in FIG. 1. The body has a generally rectangular frame or base 12 including opposite side or base rails 14 which will be described more in detail below. Opposite sidewall structures 16 extend upwardly from the base. Preferably a top or roof structure 18 extends between the upper margins of the sidewall structures and the truck body is provided with a front end wall, not shown.

As shown best in FIG. 2, the base rail 14 is formed from a relatively heavy tough material, preferably steel, so as to provide significant resistance to damage which frequently occurs to trucks as a result of minor collisions with other vehicles, loading docks and the like. By way of example only, the thickness of the material from which the base rail 14 is made preferably on the order of about one-quarter of an inch. The base rail 14 extends for the full length of the trailer body and has a first upstanding section 20 providing a lower margin of the sidewall structure 16 as shown in FIGS. 2 and 3. A lower margin of the section 20 merges with a laterally outwardly extending section 22. The section 22 in turn merges with a downwardly extending section 24 which may terminate in an inturned flange 26. The overall height of the section 24 is generally similar to the height of the section 20.

It will be observed that the lateral extent of the base rail section 22 is such that it projects well outwardly from the wall structure 16. This lateral extent of the section 22 not only gives the base rail great rigidity and resistance to collapsing as a result of laterally directed forces resulting from an impact with another vehicle or other objects, but also locates the downwardly extending section 24 so as to provide a bumper or guard for minimizing any possibility of the colliding object engaging the relatively lightweight wall structure.

The sidewall structure 16 comprises forward and rear corner posts 28 and 30 and a plurality of intermediate upstanding posts 32 extending from the base rail 14 to an upper side frame member 34. Panels 36 of thin, preferably lightweight material are disposed between the upstanding posts. Preferably the panels 36 are formed from thin sheets of aluminum.

The upstanding posts are also preferably formed from aluminum except that the front and rear corner posts may be formed from steel for added strength. As shown best in FIG. 2, the posts 32 are preferably in the form of aluminum extrusions having a central body portion 38 with a generally U-shaped cross section and oppositely extending marginal flanges 40 and 42.

The sheet material panels or skin 36 of the body are securely anchored with respect to the frame members and upstanding posts in a manner which enables the skin to absorb loads on the truck body in tension whereby to add to the strength and rigidity of the overall structure. Thus, the panels are secured to flanges 40 and 42 of the posts and to the upper frame member 34 which is relatively light in weight as compared with the base rail by a multitude of rivets 44. By way of example only, these rivets are preferably spaced from each other on about 2 inch centers.

As previously indicated, the material of the base rail is relatively thick steel. It is relatively difficult and costly to form rivet or fastener accommodating apertures in such material as compared with the lighter weight aluminum posts and the upper frame member 34.

In accordance with a feature of the present invention means is provided for securing the lower margins of the panels 36 with respect to the base rail 14 relatively easily and economically and without the need for forming a multitude of rivet accommodating apertures in the base rail. More specifically, the sidewall structure is provided with an intermediate anchor member 46 preferably in the form of an aluminum extrusion having a length similar to the length of the base rail. This anchor member which is shown best in FIGS. 2 and 3 has a lower foot or flange portion 48 adapted to rest on the section 22 of the base rail and to underlie the lower edges of the side panels and upstanding posts. The intermediate or anchor member also has an upstanding section 50 extending between the section 20 of the base rail and the lower end portions of the side panels and posts. The upstanding section 50 is formed with a relatively thin longitudinally extending web portion 52 through which apertures 54 may be easily punched for receiving panel securing rivets or fasteners 56. The apertures 54 and rivets 56 are, as indicated above, preferably spaced apart on about 2 inch centers. As will be understood, the apertures 54 may be quickly and economically punched through the relatively thin aluminum web portion 52 as compared with the forming of similar apertures through the relatively thick steel section 20 of the base rail. It will be appreciated that substantial savings may be effected in view of the fact that each truck body requires hundreds of the apertures 54 and rivets 56.

The intermediate or anchor member has relatively thick rib portions 58 and 60 extending along opposite margins of the thin web portion 52 for defining a recess 62 between the intermediate member and the base rail for accommodating inner ends of the rivets 56. The sidewall structure is completed by bolts 64 and 66 extending through the base rail section 20, the intermediate anchor member rib portions 58 and 60 and the flanges of the upstanding posts as shown in FIGS. 2 and 3. The number of such bolts required is quite small as compared with the number of rivets 56.

While a preferred embodiment of the present invention has been shown and described herein, it is obvious that many structural details may be changed without departing from the spirit and scope of the appended claims.

I CLAIM:
1. A vehicle body construction comprising a side base rail of relatively thick tough and rugged material extending longitudinally of said vehicle body, a side panel of relatively thin sheet material, an anchor member extending along said rail and a lower end portion of said panel, longitudinally spaced upstanding side posts operatively connected to said base rail and said side panel said anchor member including a relatively lightweight portion extending longitudinally thereof having a plurality of closely spaced apertures therethrough, fasteners extending through said apertures and securing said panel to said anchor member, said anchor member also including relatively heavyweight portions extending along the upper and lower margin of said relatively lightweight portion having a plurality of relatively widely spaced apertures therein, and additional relatively widely spaced fasteners extending through said relatively widely spaced apertures and securing said anchor member to said rail.

2. A vehicle body construction, as defined in claim 1, wherein said upstanding side posts extending along opposite side margins of said panel, said additional fasteners further extending through and securing said posts with respect to said anchor member and rail.

3. A vehicle body construction, as defined in claim 2, which includes additional closely spaced fasteners securing said posts to said opposite side margins of the panel.

4. A vehicle body construction, as defined in claim 2, wherein said base rail includes a first upstanding portion extending along said anchor member, panel and side posts, and a second portion extending laterally outwardly from the junction with a lower margin of said first portion and projecting laterally beneath and beyond lower ends of said panel and said posts.

5. A vehicle body construction, as defined in claim 4, wherein said base rail includes a third portion extending downwardly from an outer margin of said second portion.

6. A vehicle body construction, as defined in claim 2, wherein said anchor member is disposed between said base rail and said panel, said relatively heavyweight portion spacing said relatively lightweight portion from said rail for providing clearance for inner ends of said first mentioned fasteners.

7. A vehicle body construction, as defined in claim 6, wherein said additional fasteners extend through said relatively heavyweight portions of said anchor member.

8. A vehicle body construction, as defined in claim 7, wherein said base rail is formed from steel, said anchor member comprises an aluminum extrusion, and said panel comprises and aluminum sheet.